March 31, 1970   F. CARRIVE   3,504,204
DEVICE TO REGULATE CURRENT FROM NUMERICAL SIGNALS
Filed April 26, 1966   2 Sheets-Sheet 1
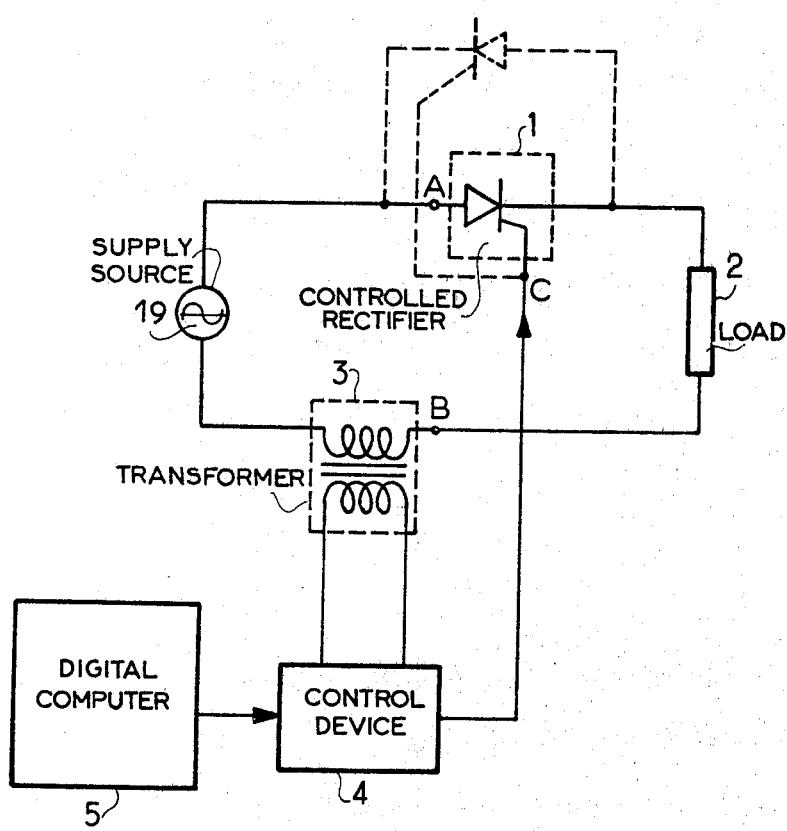
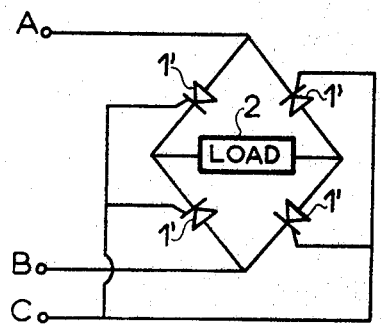
INVENTOR
FRANCOIS CARRIVE
BY Paul M. Craig, Jr.
ATTORNEY

United States Patent Office 3,504,204
Patented Mar. 31, 1970

3,504,204
DEVICE TO REGULATE CURRENT FROM NUMERICAL SIGNALS
François Carrive, Bievres, France, assignor to Compagnie Generale d'Automatisme, Paris, France
Filed Apr. 26, 1966, Ser. No. 545,400
Claims priority, application France, May 4, 1965, 15,698
Int. Cl. H03k 19/08
U.S. Cl. 307—305
5 Claims

ABSTRACT OF THE DISCLOSURE

Control system for controlling the current supplied to an electrical load including thyratron means connected with the electrical load to be supplied in a source of alternating current for supplying to the load a pre-programmed number of integral half-cycles of electric current, a control circuit operatively coupled to the control electrode of the thyratron means for applying gating on control signals thereto at appropriate low voltage points in the alternating current supply potential cycle including means for adjustably pre-setting the control circuit to cause it to supply gating on control signals to the thyratron means for any desired number of integral half-cycles of the alternating current supply.

---

Control systems for regulating the average current furnished from an alternating current source to an electrical apparatus by control thyratron-type means, are well known. The thyratron-type means, which may comprise a silicon-controlled rectifier, functions to block and re-establish current flow to a load during desired half-cycles at a frequency determined by a control signal applied to the control electrode of the thyratron-type means. It is clear that the average current furnished to a load apparatus in circuit relationship with the thyratron-type means; therefore, will be in direct proportion to the ratio between the length of time (number of half-cycles) that the thyratron-type means is conducting or "passing" current and the length of time (number of half-cycles) that the current is "blocked."

Conduction through the thyratron-type means is controlled by the appearance of half-cycles, of a proper polarity, of the alternating current supply voltage together with the application of a suitable gating-on signal to its control electrode. Turn-off of the thyratron means at the end of each half-cycle of operation is automatically assured as the supply potential reverses polarity during alternate half-cycles. The regulation of the average current furnished to the load apparatus to be controlled is obtained by causing the thyratron-type means to be in its conducting or passing state during a certain number of supply current integral half-alternations, and maintaining it in the blocked state during a certain number of other integral half-alternations.

Such control systems are known; however, most gate-controlled solid-state-thyratron-type means conduct through only a part of their cross section at the instant of turn-on or unblocking, and if an over-voltage appears at the moment of turn-on, damage to the thyratron-type means may result. To avoid this possibility, it is desirable that the control for the thyratron-type means cause it to turn-on at the instants of low voltage in a cycle of the alternating current supply potential.

In addition to the above, it is desirable that the control system provide dynamic control over the number of integral half-cycles during which the thyratron-type means is rendered conductive, and, hence, also dynamically control the number of integral-half cycles during which it is blocking or non-conductive. By this is meant that the control system can be adjustably pre-set or varied from one instant to another to thereby provide proportional control over the power supplied to the load by adjustably controlling the numbers of integral half-cycles of the supply alternating current potential during which the thyratron-type means is rendered conductive.

The control system according to the present invention comprises means to control the thyratron-type means excitation at an instant of a half-cycle of the supply current preferably when the voltage of the said current is in the zero value region. The control system also comprises means to control the operating frequency of the thyratron-type means with a numerical calculator formed by an adjustably pre-settable memory element in a logic circuit.

It should be noted that the control system according to the invention may employ as the thyratron-type means several thyratron-type devices, connected, for example, in parallel or series-circuit relationship together with appropriate gating and load sharing-circuit arrangements as is known in the art, where single devices having desired voltage and/or current ratings are not available. The thyratron-type means preferably comprises a solid-state semi-conductor thyristor, such as the silicon-controlled rectifier. If desired, however, gas discharge tubes of the thyratron-type can be employed. Also, in case both the positive and negative half-cycles of the current alternations are to be used to feed an alternating current load apparatus, the thyratron-type means may comprise pairs of silicon-controlled rectifiers connected anti-parallel or top-to-bottom in a reverse polarity, parallel circuit relationship as shown in dotted outline form in FIGURE 1. Further, in place of the anti-parallel connected silicon-controlled rectifiers, solid-state semi-conductor bilateral triode switches may be employed. Such bilateral triode switches are described in the textbook entitled Semi-conductor Controlled Rectifiers (Principles and Applications of p-n-p-n Devices) by F. E. Gentry, F. W. Gutzwiler, Nick Holonyak, Jr. and E. E. Von Zastro, published by Prentice-Hall, Inc. of Englewood Cliffs, N.J., copyrighted 1964, Library of Congress Catalog Card No. 64–21172.

The thyratron-type means may also comprise a plurality of thyristors connected in a bridge manner and used to rectify the two current alternations to feed a direct current apparatus as shown in FIGURE 3. It should be noted that the circuit arrangement shown in FIGURE 3 can be substituted into the control system shown in FIGURE 1 by merely connecting the terminals marked A, B and C to similarly marked terminals in FIGURE 1. The control system can even be adapted to a monophased or polyphased feed source in conventional fashion. At last, it is obvious that the load apparatus to be fed can be of any type.

By way of an example, the attached figures schematically represent one embodiment of the invention.

FIGURE 1 is a functional block diagram of the complete control system;

FIGURE 3 is a circuit diagram of a modified form of thyratron-type means suitable for use in producing the present invention.

Figure 2:
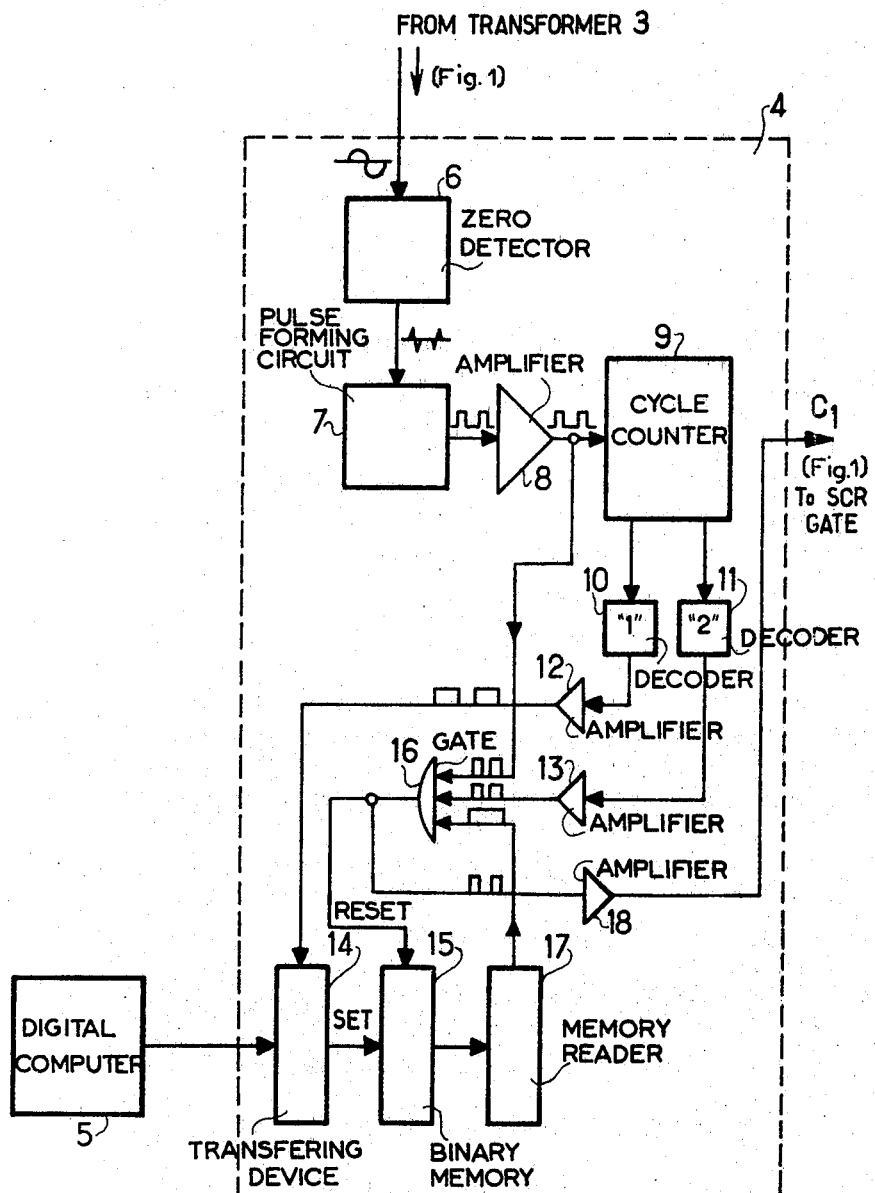
FIGURE 2 is a more detailed functional block diagram of one of its components.

In FIGURE 1, a load apparatus 2 is fed by a source of the alternating current 19 through a thyratron-type means preferably comprised by a silicon-controlled rectifier 1 (hereinafter referred to as an SCR) connected in series therewith. Elsewhere, reference numeral 5 designates a binary numerical calculator or computer having N parallel outputs, from which comes the information to control the SCR 1 by the application of the signals on the control electrode C of the SCR.

A control circuit means 4, which will be described in more detail hereinafter in connection with FIGURE 2, is inserted between the calculator 5 and the said control electrode of SCR 1. Control circuit means 4 elsewhere receives the voltage obtained from the terminals of the secondary winding of a transformer 3 whose primary winding is connected in series between the alternating current source 19 and the load apparatus 2.

FIGURE 2 is a more detailed functional block diagram of the control circuit means 4.

Control circuit means 4 comprises a zero detector 6 of conventional construction for receiving the voltage developed by the transformer 3 at its input, and for deriving at its output a series of pulses representative of the occurrence of the zero passages of the alternating current supply potential. This signal is supplied to a pulse-forming circuit 7 which further shapes the chain of synchronized impulses which are coincident with the passages through zero of the voltage at the transformer 3 output. These shaped impulses, after amplification in an amplifier 8, are applied to the input of a cycle counter means 9 which is operable to produce at its output two distinct complementary output signals, respectively symbolically designated by "1" and "2," according to whether or not it receives input impulses. A complementary output signal "1" is produced during intervals while no impulses are being supplied cycle counter 9 by amplifier 8, and an output signal "2" which complements the signal "1" is produced during intervals while impulses from amplifier 8 are being received by cycle counter 9.

The impulses corresponding to the "1" state, after having traversed a decoder 10 and an amplifier 12, are applied to a first input of a transfer circuit means 14. Transfer circuit means 14 has a second input connected to the output of the calculator 5.

The impulses corresponding to the "2" state, after having traversed a decoder 11 and an amplifier 13, are applied to one input of an AND gate 16. AND gate 16 has a second input directly connected to the output of the amplifier 8. The output of AND gate 16 is connected on one hand, by way of an amplifier 18, to a control electrode C of the SCR 1 (FIGURE 1), and on the other hand, to the re-set input of a memory means comprised by a binary deductor (calculator) 15.

The memory means 15 has its set or instruction read-in input terminal connected to the output of the transfer circuit means 14 which serves to transfer instruction from computer 5 to the memory means 15. The output of memory means 15 is supplied to a memory reader means which is comprised by a zero detector 17. The zero detector 17 determines that the pre-set count in memory means 15, which is representative of the number of integral half-cycles that SCR 1 is to conduct, has been reduced to zero, and upon this occasion, removes an enabling potential from a third input to AND gate 16. This enabling potential is applied to AND gate 16 upon pre-set instructions being read into the memory means 15 by transfer means 14. AND gate 16 only opens in the presence of output signals from the output of the amplifier 13 and the output from amplifier 8, and in the presence of an enabling potential supplied from the output of the zero detector 17. It remains open during the duration of the operation carried out by the logic circuit means formed by all of the elements 9–17. During this interval hereinafter referred to as the operating cycle, impulses appear at the output of AND gate 16 to command the state of SCR 1. In addition, the output gating on impulses are supplied to the re-set input terminal of memory means 15 to return its count to zero as the desired number of gating-on impulses are supplied to SCR 1. Hence, it can be appreciated that the binary memory means 15 deducts the control impulses to be delivered in series in each operating cycle from the pre-set number read into it from the computer 5 by the transfer means.

The information held in memory by the memory means 15 can be changed after the completion of a calculation executed by the latter; however, after the transfer of the numerical information to the control circuit means 4 by the computer 5, the memory means cannot thereafter be modified until the operating cycle is completed, and the count in the memory is reduced to zero.

From the foregoing description, it can be appreciated that with the present invention, dynamic control over the number of integral half-cycles of the alternating current supply potential supplied to the load apparatus by SCR 1 is achieved. This dynamic control is achieved by the adjustability of the pre-set count that can be read into the binary memory by the computer upon the completion of each operating cycle. Thus, the count can be varied from one operating cycle to another in accordance with the current demands of the load as determined by the computer. Further, since gating-on signals are supplied to the control electrode means of the thyratron-type means only during intervals while the alternating current supply potential is in the zero or low voltage value region, proper turn-on and operation of the thyratron-type means is assured.

Other embodiments, variations, and the like will be suggested to those skilled in the art in the light of the above teachings. It is therefore to be understood that the present invention is in no way limited to the particular embodiments disclosed, but is intended to cover any such variations, embodiments, and the like as set forth in the appended claims.

I claim:

1. An automatic control system for controlling the current supplied to an electrical load including in combination:

thyratron-type means connected in electric circuit relationship with the electrical load to be supplied and a source of alternating current supply potential for supplying to the load a pre-programmed number of integral half-cycles of electric current, said thyratron-type means having control electrode means, control circuit means operatively coupled to said control electrode means for applying gating on control signals thereto at appropriate low voltage points in the alternating current supply potential cycle, including:

zero detector circuit means operatively coupled to the source of alternating current supply potential for detecting the point at which the supply potential value passes through low value, pulse-forming circuit means connected to the output of the zero detector circuit means, for deriving shaped signal pulses indicative of the potential value of the alternating current supply potential passing through the predetermined low value, and for applying such shaped signal pulses to the logic circuit means defined thereafter, logic circuit means coupled to the output of said pulse forming circuit means and including:

transfer means for supplying pre-set information to a memory means to pre-set the memory means and adapted to have one of its inputs coupled to a computer or other source of instructions, cycle counter means coupled to the output of said pulse-forming circuit means for deriving first and second complementary output signals, the first complementary output signal being applied to the transfer means to control the transfer of pre-setting instructions to the memory means, memory reading means having its input coupled to the output of the memory means, and AND circuit means having inputs connected to the output of said memory reading means, to the output of said pulse-forming means, and to the second complementary output signal from the cycle counter means, said AND circuit means serving to derive the gating-signal pulses applied to the control electrode means of the thyratron-type means and having an additional output applied to the memory means as a re-set signal.

2. The automatic control system set forth in claim 1, wherein the thyratron-type means comprises at least one solid-state semi-conductor thyristor.

3. The automatic control system set forth in claim 1, wherein the thyratron-type means comprises a plurality of thyristors connected in reverse polarity parallel circuit relationship.

4. The automatic control system set forth in claim 1, wherein the thyratron-type means comprises a plurality of thyristors connected in a bridge configuration for supplying regulated direct current to the load.

5. Control circuit means for controlling electrical apparatus comprising:

zero detector circuit means adapted to be operatively coupled to a source of alternating current supply potential for detecting the point at which the supply potential value passes through zero, logic circuit means operatively coupled to the output of said zero detector circuit means and having memory means into which a desired number of integral half-cycles of conduction through the electrical apparatus to be controlled can be pre-set, the output of said logic circuit means being adapted to be operatively coupled to the electrical apparatus to be controlled, and pulse-forming circuit means interposed between the output of said zero detector circuit means and the input to the logic circuit means for deriving shaped signal pulses indicative of the potential value of the alternating current supply potential passing through zero value, and for applying such shaped signal pulses to said logic circuit means, wherein the logic circuit means includes transfer means for supplying pre-set information to the memory means to pre-set the memory means and adapted to have one of its inputs coupled to a computer or other source of instruction, cycle counter means coupled to the output of said pulse-forming circuit means for deriving first and second complementary output signals, the first complementary output signal being applied to the transfer means to control the transfer of pre-setting instructions to the memory means, memory-reading means having its input coupled to the output of the memory means, and AND circuit means having inputs connected to the output of said memory-reading means, the output of said pulse-forming means, and to the second complementary output signal from the cycle counter means, said AND circuit means serving to derive the gating signal pulses to be applied to the apparatus to be controlled, and having an additional output applied to the memory means as a re-set signal.

References Cited

UNITED STATES PATENTS

| | | | |
|---|---|---|---|
| 2,862,114 | 11/1958 | Soloman | 328—75 X |
| 3,251,000 | 5/1966 | Suel | 328—75 X |
| 3,295,048 | 12/1966 | Wouk et al. | 307—252 X |
| 3,305,844 | 2/1967 | Yadav et al. | 307—252 X |
| 3,354,377 | 11/1967 | Leeds | 307—252 X |

DONALD D. FORRER, Primary Examiner

R. C. WOODBRIDGE, Assistant Examiner

U.S. Cl. X.R.

307—252; 315—251; 328—72, 81, 86